(12) United States Patent
Sasaki

(10) Patent No.: US 9,122,187 B2
(45) Date of Patent: *Sep. 1, 2015

(54) CHARGING DEVICE, IMAGE FORMING APPARATUS, AND COMPUTER PROGRAM PRODUCT

(71) Applicant: RICOH COMPANY, LIMITED, Ohta-Ku (JP)

(72) Inventor: Junichi Sasaki, Miyagi (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/707,126

(22) Filed: Dec. 6, 2012

(65) Prior Publication Data
US 2013/0094883 A1 Apr. 18, 2013

Related U.S. Application Data

(63) Continuation of application No. 12/834,282, filed on Jul. 12, 2010.

(30) Foreign Application Priority Data

Jul. 14, 2009 (JP) ................................. 2009-165486
May 26, 2010 (JP) ................................. 2010-120429

(51) Int. Cl.
*H02J 7/00* (2006.01)
*G03G 15/02* (2006.01)

(52) U.S. Cl.
CPC .......... *G03G 15/0266* (2013.01); *H02J 7/0016* (2013.01); *H02J 7/0052* (2013.01); *H02J 7/0021* (2013.01)

(58) Field of Classification Search
USPC ...................... 320/155, 157–159, 166; 399/88
See application file for complete search history.

(56) References Cited

U.S. PATENT DOCUMENTS 5,063,340 A 11/1991 Kalenowsky
5,969,505 A * 10/1999 Okamura ...................... 320/122
(Continued)

FOREIGN PATENT DOCUMENTS

JP 3306325 5/2002
JP 2005-253289 9/2005
JP 2009-112115 5/2009

OTHER PUBLICATIONS

Office Action issued Feb. 4, 2014 in Japanese Application No. 2010-120429.
(Continued)

*Primary Examiner* — Drew A Dunn
*Assistant Examiner* — Steve T Chung
(74) *Attorney, Agent, or Firm* — Oblon, McClelland, Maier & Neustadt, L.L.P.

(57) ABSTRACT

An charging device includes: capacitors connected in series; a charging unit that charges the capacitors; bypass units, each respectively connects in parallel to each capacitors, wherein each bypass unit causes, when a charged voltage of any capacitor has reached a set voltage, a charging current to bypass the capacitor whose charged voltage has reached the set voltage; and a control unit that controls the charging unit to charge the capacitors in such a manner that, when a charging voltage of the any capacitor has reached the set voltage, the control unit causes the charging unit to reduce the charging current, and if a predetermined period has elapsed since the charging voltage has reached the set voltage, and if a charging voltage of any of the other capacitors has not reached the set voltage after the predetermined period, the control unit causes the charging unit to increase the charging current.

5 Claims, 9 Drawing Sheets

(56) References Cited

U.S. PATENT DOCUMENTS

| | | | |
|---|---|---|---|
| 5,977,748 A * | 11/1999 | Okamura | 320/118 |
| 6,316,917 B1 * | 11/2001 | Ohta | 320/166 |
| 6,323,623 B1 | 11/2001 | Someya et al. | |
| 6,404,170 B2 | 6/2002 | Okamura et al. | |
| 7,227,407 B2 * | 6/2007 | Yano et al. | 327/565 |
| 7,825,638 B2 * | 11/2010 | Bolz et al. | 320/166 |
| 7,949,885 B2 * | 5/2011 | Kikuchi et al. | 713/300 |
| 8,072,724 B2 | 12/2011 | Shiner et al. | |
| 2007/0001651 A1 | 1/2007 | Harvey | |
| 2007/0212103 A1 * | 9/2007 | Kikuchi | 399/88 |
| 2009/0278504 A1 | 11/2009 | Tsubota et al. | |

OTHER PUBLICATIONS

Office Action issued Aug. 29, 2013 in U.S. Appl. No. 12/834,282.

* cited by examiner

CHARGING DEVICE, IMAGE FORMING APPARATUS, AND COMPUTER PROGRAM PRODUCT

CROSS-REFERENCE TO RELATED APPLICATIONS

This application is a continuation of and claims the benefit of priority from U.S. Ser. No. 12/834,282, filed Jul. 12, 2010, which claims the benefit of priority from Japanese Patent Application No. 2009-165486, filed Jul. 14, 2009 and Japanese Patent Application No. 2010-120429, filed May 26, 2010, the entire contents of each of which are incorporated herein by reference.

BACKGROUND OF THE INVENTION

1. Field of the Invention

The present invention relates to a charging device for charging a capacitor unit that includes therein a plurality of capacitors connected in series, an image forming apparatus that includes the charging device, and a computer program product.

2. Description of the Related Art

Recent capacitors have high capacity and excellent charge-discharge cycle characteristics, and therefore have been used in place of backup power supplies for electronic devices, auxiliary power supplies for image forming apparatuses, and batteries for motor vehicles and other various transportation devices. Furthermore, from the standpoint of the effective utilization of energy, the use of capacitors for storing nighttime power has been considered.

In the case of charging a capacitor unit that has therein a plurality of capacitors connected in series, it is commonly known that to charge the capacitors efficiently, when any of the capacitors has reached a predetermined charging voltage, the charging current for charging the capacitor is bypassed by a bypass circuit (a parallel monitor).

However, in the case of bypassing the charging current through the bypass circuit, there is a problem that loss of charging current occurs in the bypass circuit. To cope with this problem, there is disclosed a capacitor charging circuit capable of reducing power consumption in such a manner that when any one of the plurality of capacitors has reached a predetermined charging voltage and the charging current for charging the capacitor is bypassed by a bypass circuit, the charging current flowing into the capacitors is reduced, thereby suppressing power loss (for example, see Japanese Patent Application Laid-open No. 2005-253289).

However, the capacitor charging circuit disclosed in Japanese Patent Application Laid-open No. 2005-253289 has a problem that if the voltage balance among the capacitors is disrupted by the degradation of capacity due to the degradation of capacitors, self-discharge caused by being left without maintenance for a long time, or the like, even when one of the capacitors has reached the predetermined charging voltage, respective charging voltages of the other capacitors may be much lower than the charged voltage of the capacitor. In such a case, when a capacitor unit is charged with a reduced charging current, it takes a long time to charge the capacitor unit.

SUMMARY OF THE INVENTION

It is an object of the present invention to at least partially solve the problems in the conventional technology.

According to an aspect of the present invention, there is provided a charging device including: a plurality of capacitors that are connected in series; a charging unit that charges the capacitors; a plurality of bypass units, each of which respectively connects in parallel to each of the capacitors, wherein each bypass unit causes, when a charged voltage of any of the capacitors has reached a set voltage, a charging current to bypass the capacitor whose charged voltage has reached the set voltage; and a control unit that controls the charging unit to charge the capacitors in such a manner that, when a charging voltage of the any of the capacitors has reached the set voltage, the control unit causes the charging unit to reduce the charging current that is to be applied to the any of the capacitors, and if a predetermined period of time has elapsed since the charging voltage of the any capacitor has reached the set voltage, and if a charging voltage of any of the other capacitors has not reached the set voltage after the predetermined period of time has elapsed, the control unit causes the charging unit to increase the charging current that is to be applied to the capacitors.

According to another aspect of the present invention, there is provided an image forming apparatus including: an image forming unit; and a charging device, wherein the charging device includes a plurality of capacitors that are connected in series; a charging unit that charges the capacitors; a plurality of bypass units, each of which respectively connects in parallel to each of the capacitors, wherein each bypass unit causes, when a charged voltage of any of the capacitors has reached a set voltage, a charging current to bypass the capacitor whose charged voltage has reached the set voltage; and a control unit that controls the charging unit to charge the capacitors in such a manner that, when a charging voltage of the any of the capacitors has reached the set voltage, the control unit causes the charging unit to reduce the charging current that is to be applied to the any of the capacitors, and if a predetermined period of time has elapsed since the charging voltage of the any capacitor has reached the set voltage, and if a charging voltage of any of the other capacitors has not reached the set voltage after the predetermined period of time has elapsed, the control unit causes the charging unit to increase the charging current that is to be applied to the capacitors.

According to still another aspect of the present invention, there is provided a computer program product including a computer-usable medium having computer-readable program codes embodied in the medium for processing charging device that includes: a plurality of capacitors that are connected in series; a charging unit that charges the capacitors; a plurality of bypass units, each of which respectively connects in parallel to each of the capacitors, wherein each bypass unit causes, when a charged voltage of any of the capacitors has reached a set voltage, a charging current to bypass the capacitor whose charged voltage has reached the set voltage; and a control unit that controls the charging unit to charge the capacitors, the program codes when executed causing a computer to execute: controlling the charging unit to reduce the charging current that is to be applied to the any of the capacitors, when a charging voltage of the any of the capacitors has reached the set voltage; and controlling the charging unit to increase the charging current that is to be applied to the capacitors if a predetermined period of time has elapsed since the charging voltage of the any capacitor has reached the set voltage, and if a charging voltage of any of the other capacitors has not reached the set voltage after the predetermined period of time has elapsed.

The above and other objects, features, advantages and technical and industrial significance of this invention will be better understood by reading the following detailed descrip-

DETAILED DESCRIPTION OF THE PREFERRED EMBODIMENTS

Exemplary embodiments of a charging device, an image forming apparatus that includes the charging device, and a computer program product according to the present invention are explained in detail below with reference to the accompanying drawings.

First Embodiment

Figure 1:
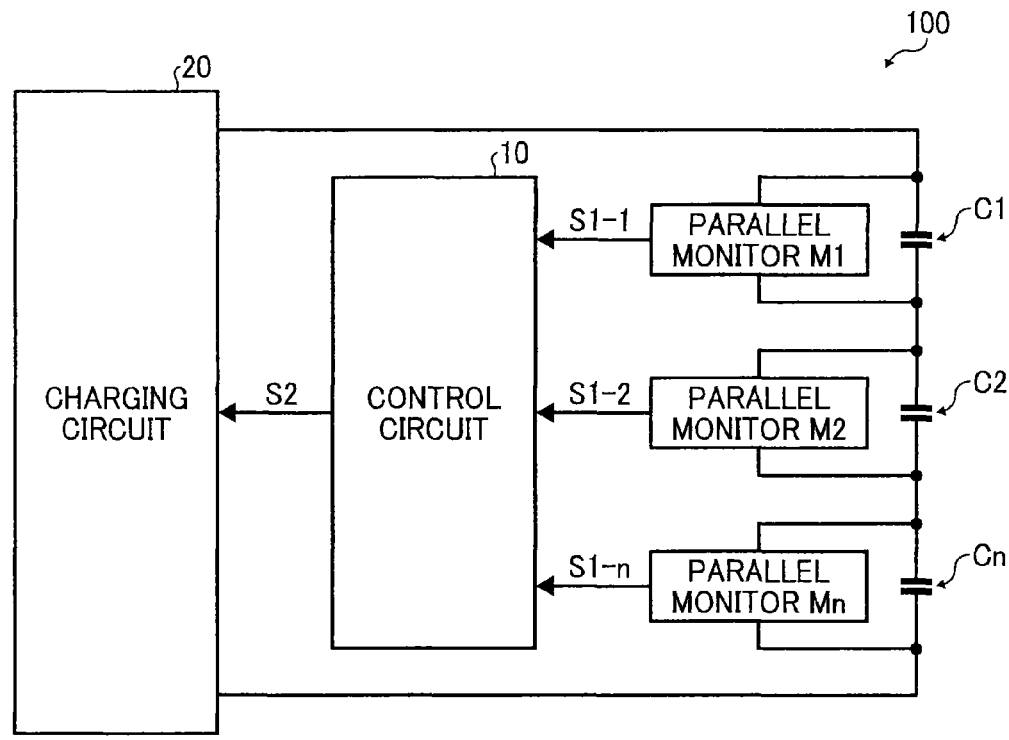
FIG. 1 is a block diagram illustrating a configuration of a charging device according to a first embodiment.

FIG. 1 is a block diagram illustrating a configuration of a charging device according to a first embodiment. A charging device 100 according to the present embodiment charges a capacitor unit, which has a plurality of capacitors therein connected in series, by the constant-current operation and the constant-power operation. As shown in FIG. 1, the charging device 100 mainly includes capacitors C1 to Cn, parallel monitors M1 to Mn, a charging circuit 20, and a control circuit 10.

The capacitors C1 to Cn store charging power therein, and are made of for example electric double layer capacitors, lithium ion capacitors, or the like. In the present embodiment, the capacitors C1 to Cn are connected in series, thereby composing the capacitor unit including the capacitors C1 to Cn. For example, in a case where re-numbers of the capacitors C1 to Cn with 2.5 volts on a full charge are connected in series, the capacitor unit is fully charged by charging the capacitors with a voltage of 2.5×n volts when stored.

The parallel monitors M1 to Mn are connected in parallel to the capacitors C1 to Cn, respectively. The parallel monitors M1 to Mn detect a charging voltage of the connected capacitor, and make the charging current being applied to the capacitor any capacitor whose charging voltage is detected to reach a set voltage that is set in advance. A transistor, a field effect transistor (FET), a thyristor, an insulated gate bipolar transistor (IGBT), or the like is used in the bypassing of the charging current. When a charging voltage of the parallely-connected capacitors C1 to Cn has reached the set voltage, the parallel monitors M1 to Mn transmit a signal S1 indicating that effect to the control circuit 10. Incidentally, in the present embodiment, as shown in FIG. 1, the signal S1 transmitted by the parallel monitor M1 is referred to as a signal S1-1, the signal S1 transmitted by the parallel monitor M2 is referred to as a signal S1-2, and the signal S1 transmitted by the parallel monitor Mn is referred to as a signal S1-$n$.

The charging circuit 20 applies the charging current to the plurality of capacitors in the capacitor unit based on the control on the charging operation made by the control circuit 10, thereby charging the capacitor unit. In the present embodiment, when receiving a signal S2 indicating the control on the charging operation from the control circuit 10, the charging circuit 20 charges the capacitor unit in accordance with the received signal S2.

The control circuit 10 performs a function of controlling the charging current in the charging device 100 and a time keeping function that measures an elapsed time. Specifically, when the charging device 100 receives a signal S1 indicating that a charging voltage of any of the capacitors has reached the set voltage from any of the parallel monitors, the control circuit 10 starts to measure the time and transmits a signal S2 instructing to reduce the charging current applied to the capacitor unit to be lower than that at the start of charging to the charging circuit 20. When receiving the signal S2 instructing to reduce the charging current, the charging circuit 20 charges the capacitor unit with a reduced constant charging current (constant current). Consequently, it is possible to suppress power loss caused by the bypassing of the charging current by the parallel monitor.

At this time, if respective charging voltages of the capacitors C1 to Cn are all close to the set voltage, even when the charging current is reduced after a charging voltage of one of the capacitors has reached the set voltage, all the charging voltages of the capacitors C1 to Cn will soon reach the set voltage. However, if the voltage balance among the other capacitors is disrupted for some reason, it takes a long time for all the charging voltages of the capacitors C1 to Cn to reach the set voltage.

Namely, when the predetermined period of time has elapsed since the start of time measurement, if the control circuit 10 has not received the signals S1 indicating that the charging voltage of the capacitor has reached the set voltage from all the parallel monitors M1 to Mn, the control circuit 10 determines that the voltage balance among the capacitors is disrupted. Then, the control circuit 10 transmits a signal S2 to the charging circuit 20, the signal S2 instructing to increase the charging current to the capacitor unit. When receiving the signal S2 instructing to increase the charging current, the charging circuit 20 charges the capacitor unit while increasing the charging current. Consequently, even if the voltage balance among the capacitors is disrupted, it is possible to reduce the charging time for the capacitor unit.

Figure 2:
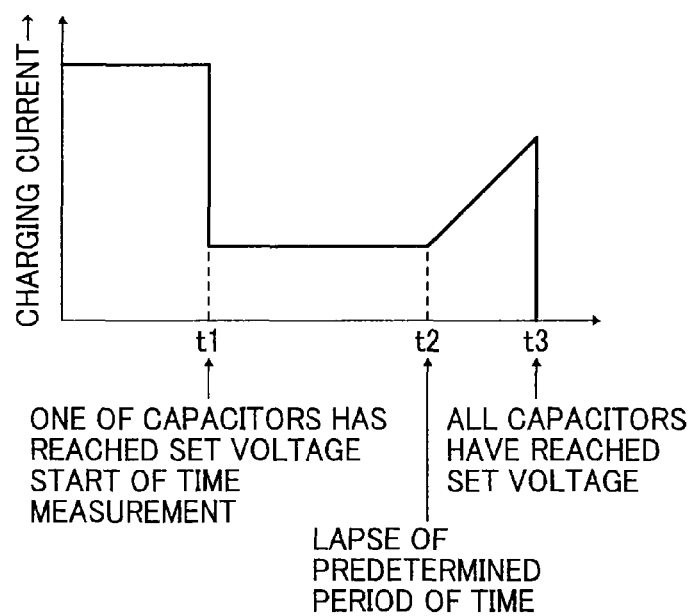
FIG. 2 is an explanatory diagram illustrating changes in charging current being applied to a capacitor unit in the charging device according to the first embodiment.

Changes in charging current to the capacitor unit when the charging operation is controlled by the control circuit 10 as described above is described. FIG. 2 is an explanatory diagram illustrating changes in charging current applied to the capacitor unit by the charging circuit 20 according to the first embodiment. Charging current shown in the vertical axis in FIG. 2 denotes the magnitude of electrical current output from the charging circuit 20. As shown in FIG. 2, the charging device 100 according to the present embodiment starts charging the capacitor unit with a constant charging current. And when a charging voltage of any one of the capacitors has reached the set voltage (a time t1), the charging device 100 charges the capacitor unit with a reduced charging current and starts the time measurement. Then, when a predetermined period of time has elapsed (a time t2), if a charging voltage of any one or more of the capacitors has not reached the set voltage, the charging device 100 charges the capacitor unit with the charging current that is continuously being increased of the charging current. Then, when the charging voltages of all the capacitors have reached the set voltage (a time t3), the application of the charging current is stopped.

Figure 3:
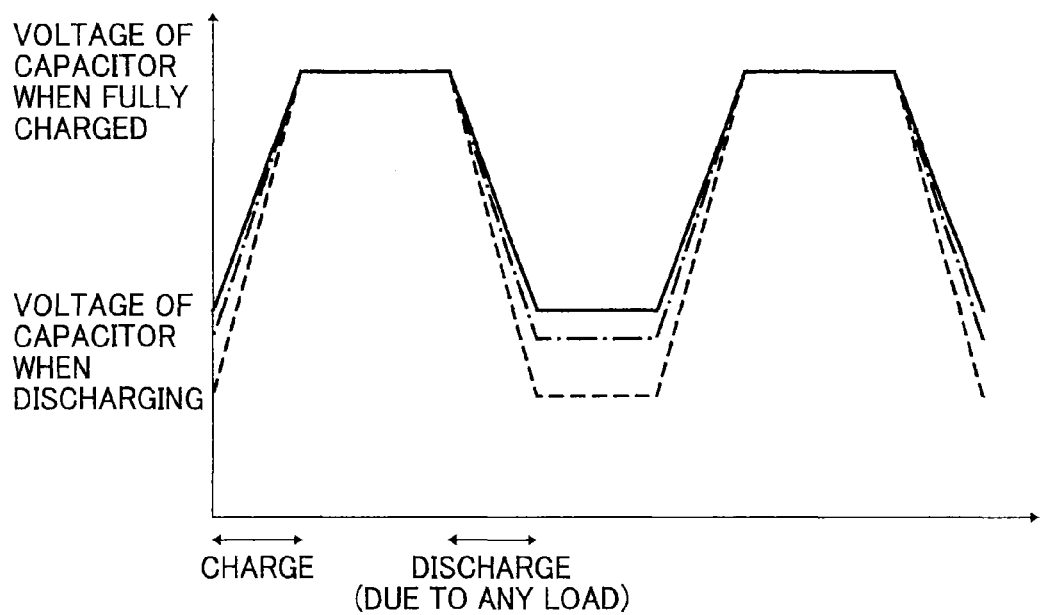
FIG. 3 is an explanatory diagram illustrating changes in voltage of a capacitor that discharges an electrical current to any load.

Subsequently, the voltage of each capacitor is explained in detail. FIG. 3 is an explanatory diagram illustrating changes in voltage of each capacitor that discharges an electrical current to any load. FIG. 3 illustrates changes in voltage of each capacitor between when the capacitor is charged and when the capacitor discharges an electrical current. In the parallel monitor circuits, the capacitors, when fully charged, all are to have the uniform voltage even if the voltages of the capacitors when discharged are not uniform due to a variation in capacity among the capacitors. Therefore, even if the charging current is reduced after the charging voltage of one of the capacitors has reached the set voltage, the voltages of the capacitors can be made uniform in a short time. In FIG. 3, the slope of reduction in voltage of each capacitor depends on the capacity of the capacitor and a value of current to a load.

Figure 4:
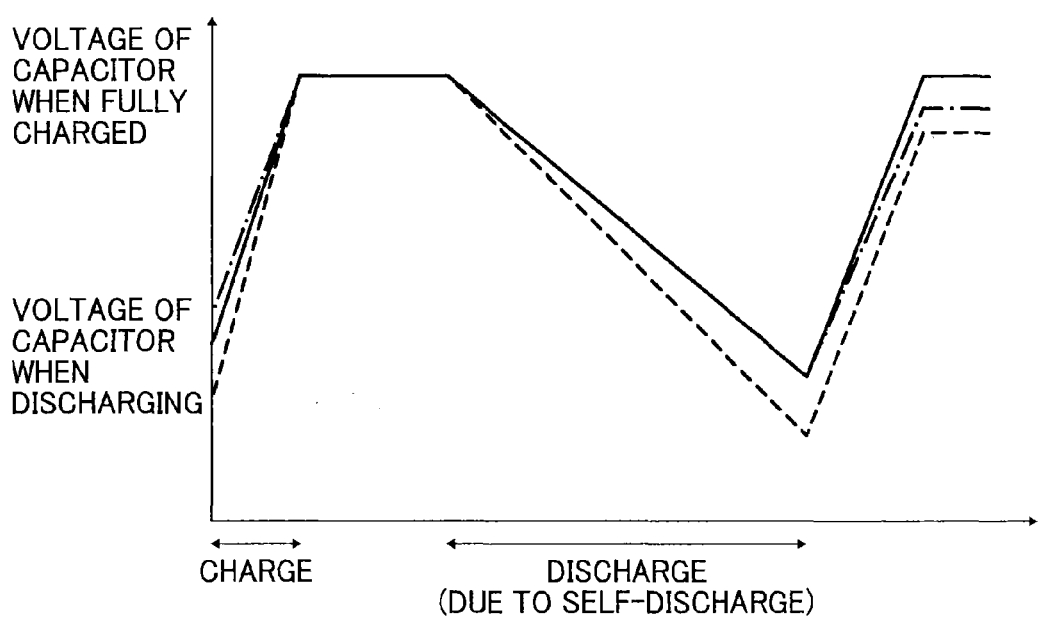
FIG. 4 is an explanatory diagram illustrating changes in voltage of a capacitor that discharges due to a leakage current.

On the other hand, a case where self-discharge occurs in the capacitors is described. FIG. 4 is an explanatory diagram illustrating changes in voltage of each capacitor that discharges due to a leakage current. When the capacitors after being charged have been left for a long time, the voltage of each capacitor is decreased because of a leakage current. A rate of the decrease in voltage depends on the insulated structure inside the capacitor and materials that are used therein, and is not proportional to the capacity of the capacitor. Therefore, the decrease in voltage of each capacitor when left for a long time is different from what is shown as in FIG. 3. i.e., different from the decrease in voltage of each capacitor when discharging an electrical current due to any load.

When the capacitors have been left for a long time and discharge an electrical current, if the capacitor unit is charged by a conventional charging device, as shown in FIG. 4, there is a larger variation in voltage among the capacitors when a charging voltage of one of the capacitors has reached the set voltage. Therefore, when a charging voltage of any one or more of the capacitors has reached the set voltage, if the charging current is reduced for the purpose of suppressing the voltage loss in the parallel monitors, the charging time is greatly lengthened.

Figure 5:
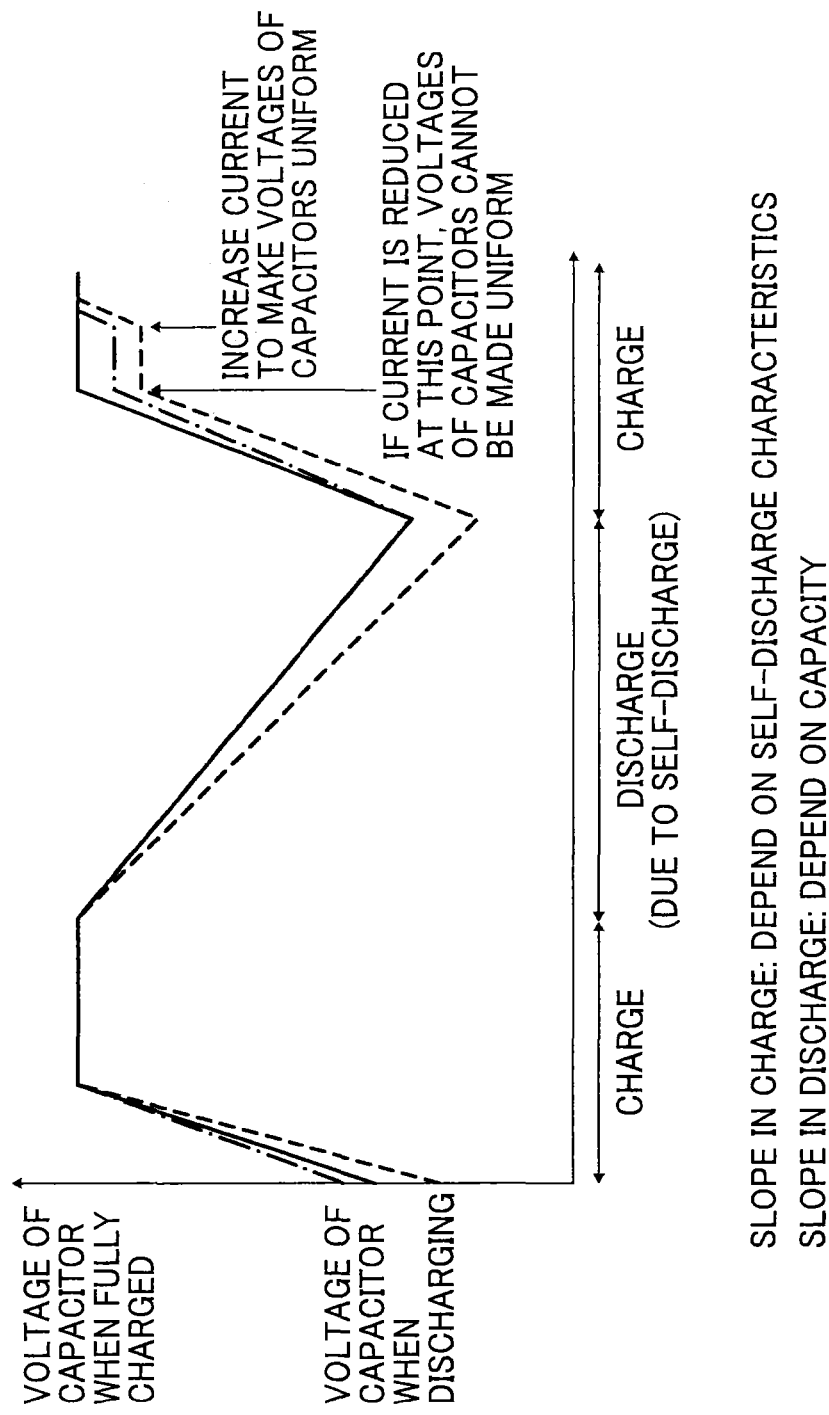
FIG. 5 is an explanatory diagram illustrating changes in voltage of a capacitor that discharges due to a leakage current.

Consequently, in the charging device 100 according to the present embodiment, the charging time is reduced. FIG. 5 is an explanatory diagram illustrating changes in voltage of each capacitor that discharges due to a leakage current. In a case where self-discharge is caused in the capacitors as shown in FIG. 5, after the charging current, at a time when the charging voltage of one of the capacitors has reached the set voltage, is reduced, even though the charging voltages of the other capacitors have not reached the set voltage within the predetermined period of time, the voltages of all the capacitors can be made uniform in a short time by increasing the charging current. Incidentally, the increase in charging current leads to an increase in power loss in the parallel monitors; however, the charging time can be reduced, so the power loss and other losses caused by waiting for the completion of charging can be reduced, and therefore, the losses can be comprehensively reduced. For example, an apparatus, such as an image forming apparatus, which includes the charging device 100 may have a function of making the transition from a normal power consumption mode to an energy-saving mode if the apparatus has not received any request for a job for a certain period of time to reduce power consumption. However, while the charging device 100 charges the capacitor unit, the apparatus cannot make the transition to the energy-saving mode; therefore, assuming a waiting time to complete the charging is increased to, for example, about 5 to 10 minutes, the apparatus cannot make the transition to the energy-saving mode all that time, which may cause a loss that power consumption cannot be effectively reduced. The charging device 100 according to the present embodiment can reduce the charging time, and therefore, it is possible to reduce such a loss.

Figure 6:
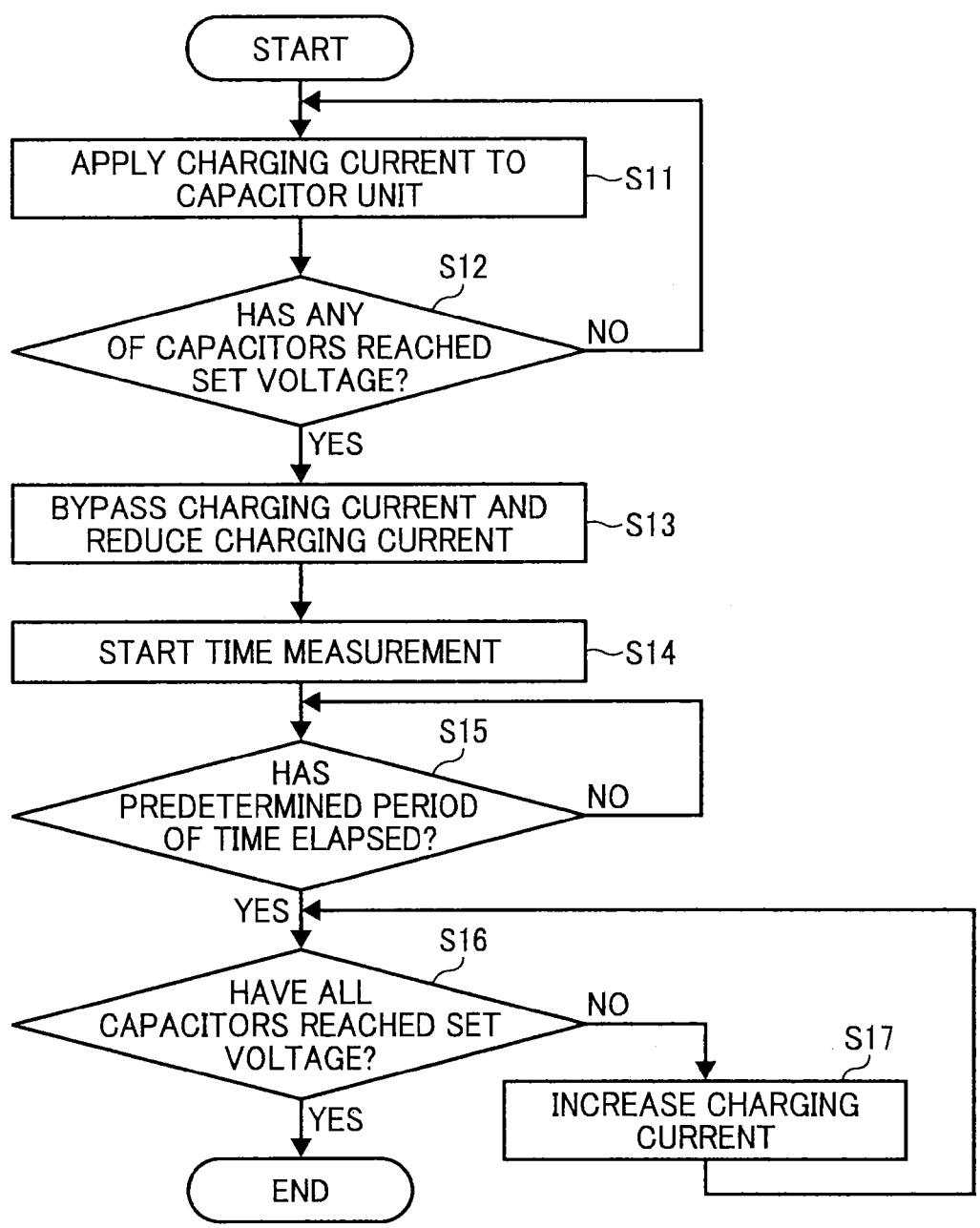
FIG. 6 is a flowchart illustrating the flow of a charging process performed by the charging device according to the first embodiment.

Subsequently, a process of charging the capacitor unit performed by the charging device 100 according to the present embodiment is described. FIG. 6 is a flowchart illustrating the flow of the charging process performed by the charging device 100 according to the first embodiment.

First, the control circuit 10 causes the charging circuit 20 to apply a predetermined charging current to the capacitor unit thereby charging the capacitor unit (Step S11). Then, the control circuit 10 determines whether a charging voltage of any of the capacitors has reached a predetermined set voltage (Step S12). The control circuit 10 determines whether a charging voltage of any of the capacitors has reached the set voltage depending on whether the control circuit 10 has received a signal S1 from any of the parallel monitors connected in parallel to the capacitors.

If a charging voltage of any of the capacitors has not reached the set voltage (NO at Step S12), the process returns to Step S11, and the capacitor unit is charged until a charging voltage of any of the capacitors has reached the set voltage. On the other hand, when a charging voltage of any of the capacitors has reached the set voltage (YES at Step S12), the control circuit 10 causes the parallel monitor to make bypass the charging current that is applied to the capacitor whose charging voltage has reached the set voltage and causes the charging circuit 20 to reduce the charging current (Step S13), and starts the time measurement (Step S14).

Then, the control circuit 10 determines whether a predetermined period of time has elapsed (Step S15). If the predetermined period of time has not yet elapsed (NO at Step S15), the capacitor unit is to be charged with the reduced charging current. On the other hand, when the predetermined period of time has elapsed (YES at Step S15), the control circuit 10 determines whether the charging voltages of all the capacitors have reached the set voltage (Step S16).

If the charging voltage of any one or more of the capacitors has not reached the set voltage (NO at Step S16), the control circuit 10 causes the charging circuit 20 to increase the charging current (Step S17), and the process returns to Step S16. In this case, the charging current being applied to the capacitor (s) whose charging voltage has reached the set voltage is bypassed by the parallel monitor, so that only the capacitor(s)

whose charging voltage has not reached the set voltage is applied with the charging current. On the other hand, when the charging voltages of all the capacitors have reached the set voltage (YES at Step S16), the charge of the capacitor unit is completed, and the process is terminated.

In this manner, in the case where the charging device 100 according to the present embodiment charges the capacitor unit, when a charging voltage of any of the capacitors has reached the set voltage, the charging device 100 charges the capacitor unit with the reduced charging current, and starts the time measurement. Consequently, it is possible to suppress the power losses in the parallel monitors.

Then, if the charging voltage of any one or more of the capacitors has not reached the set voltage even after a predetermined period of time has elapsed since the charging current has been reduced, it is determined that the voltage balance among the capacitors is disrupted, and the capacitor unit is charged with the charging current while continuously increasing the charging current. Consequently, even in the case where the voltage balance among the capacitors is disrupted, it is possible to suppress the power losses that are to be used in the parallel monitors, and also possible to reduce the charging time of the capacitor unit.

First Variation:

In the above embodiment, if a charging voltage of any one or more of the capacitors has not reached the set voltage even after a predetermined period of time has elapsed since the capacitor unit has been charged with the reduced charging current, the capacitor unit is charged with the charging current while continuously increasing the charging current. As a first variation of the first embodiment, the capacitor unit can be charged with the charging current while increasing the charging current on a step-by-step basis.

Figure 7:
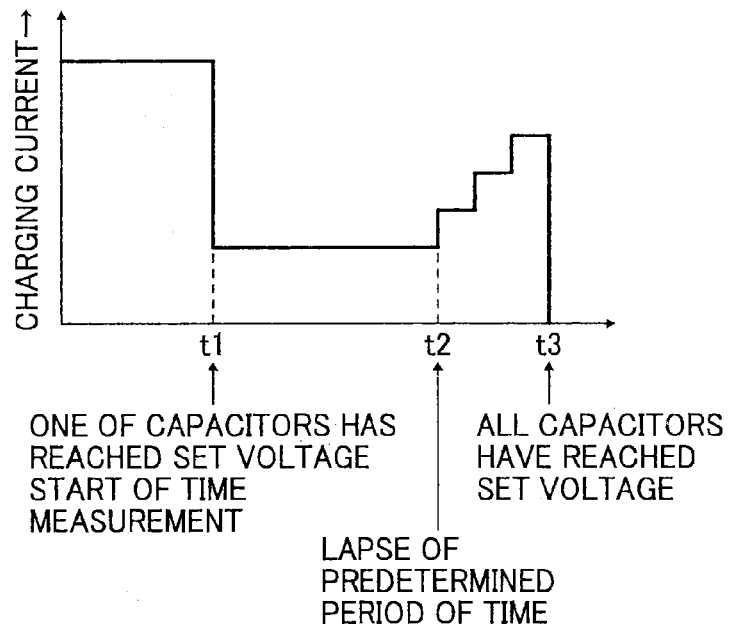
FIG. 7 is an explanatory diagram illustrating changes in charging current being applied to the capacitor unit in the charging device according to a first variation of the first embodiment.

FIG. 7 is an explanatory diagram illustrating changes in charging current being applied to the capacitor unit in a charging device according to the first variation. As shown in FIG. 7, the charging device according to the first variation starts charging the capacitor unit with a constant charging current, and when a charging voltage of any one of the capacitors has reached the set voltage (a time t1), charges the capacitor unit with a reduced charging current and starts the time measurement. Then, when a predetermined period of time has elapsed (a time t2), and if a charging voltage of any one or more of the capacitors has not reached the set voltage, the charging device charges the capacitor unit with the charging current while increasing the charging current on a step-by-step basis. Then, when the charging voltages of all the capacitors have reached the set voltage (a time t3), the application of the charging current is stopped.

In this manner, when the charging device according to the first variation charges the capacitor unit, in the same manner as in the above embodiment, if a charging voltage of any of the capacitors has reached the set voltage, the charging device reduces the charging current and charges the capacitor unit with the reduced charging current, and starts the time measurement. Consequently, it is possible to suppress the power losses in the parallel monitors.

Then, if a charging voltage of any one or more of the capacitors has not reached the set voltage even after the predetermined period of time has elapsed since the charging current has been reduced, the charging device determines that the voltage balance among the capacitors is disrupted, and charges the capacitor unit with the charging current while increasing the charging current on a step-by-step basis. Consequently, even in the case where the voltage balance among the capacitors is disrupted, it is possible to suppress the power losses in the parallel monitors, and also possible to reduce the charging time of the capacitor unit.

Second Variation:

In the above embodiment, if a charging voltage of any one or more of the capacitors has not reached the set voltage even after a predetermined period of time has elapsed since the capacitor unit has been charged with the reduced charging current, the capacitor unit is charged with the charging current while continuously increasing the charging current. As a second variation of the first embodiment, the capacitor unit can be charged in such a manner that when the charging current has been continuously increased and reached a predetermined current value, the increase in charging current is stopped.

In FIG. 2 for the above embodiment, when the charging voltages of all the capacitors have reached the set voltage, the charging current is stopped to apply; however, if the voltage balance among the capacitors at the start of charging is disrupted, a current value to which the charging current is increased may become a very large value, and therefore, bypass devices of the parallel monitors need to be designed to have a high rated capacity. To cope with this, when the charging current has reached a predetermined current value with the continuous increase in charging current being applied to the capacitor unit, the control circuit 10 stops the increase in charging current being applied to the capacitor unit, and causes the capacitor unit to be charged with the constant charging current.

Figure 8:
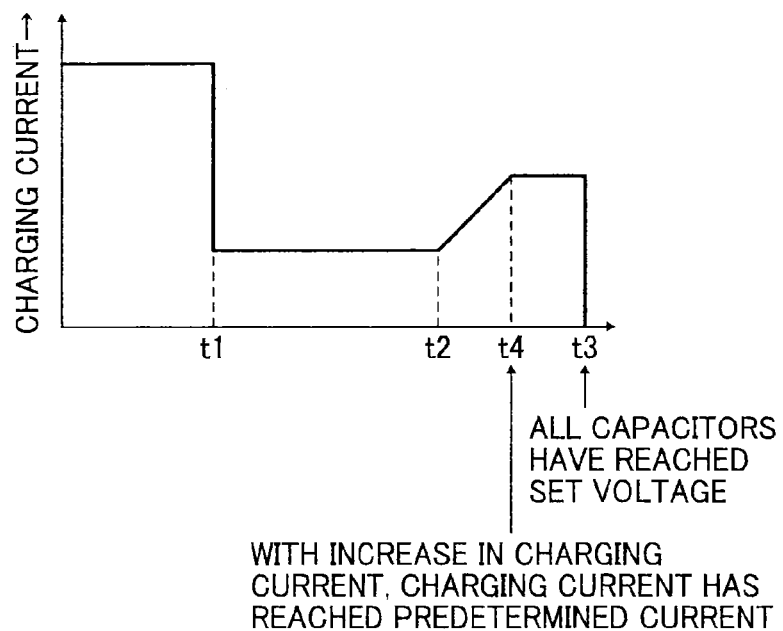
FIG. 8 is an explanatory diagram illustrating changes in charging current being applied to the capacitor unit in the charging device according to a second variation of the first embodiment.

FIG. 8 is an explanatory diagram illustrating changes in charging current being applied to the capacitor unit in a charging device according to the second variation. As shown in FIG. 8, the charging device according to the second variation starts charging the capacitor unit with a constant charging current, and when a charging voltage of any one of the capacitors has reached the set voltage (a time t1), charges the capacitor unit with a reduced charging current and starts the time measurement. Then, when a predetermined period of time has elapsed (a time t2), if a charging voltage of any one or more of the capacitors has not reached the set voltage, the charging device charges the capacitor unit with the charging current while continuously increasing the charging current. Then, when the charging current has reached a predetermined current value (a time t4), the charging device stops the increase in charging current, and charges the capacitor unit with the constant charging current. Then, when the charging voltages of all the capacitors have reached the set voltage (a time t3), the charging device stops the application of the charging current.

In this manner, when the charging device according to the second variation charges the capacitor unit, in the same manner as in the above embodiment, if a charging voltage of any of the capacitors has reached the set voltage, the charging device reduces the charging current and charges the capacitor unit with the reduced charging current, and starts the time measurement. Consequently, it is possible to suppress the power losses in the parallel monitors.

Then, if a charging voltage of any one or more of the capacitors has not reached the set voltage even after the predetermined period of time has elapsed since the charging current has been reduced, the charging device determines that the voltage balance among the capacitors is disrupted, and charges the capacitor unit with the charging current while continuously increasing the charging current. Consequently, even in the case where the voltage balance among the capacitors is disrupted, it is possible to suppress the power losses in the parallel monitors, and also possible to reduce the charging time of the capacitor unit.

Furthermore, when the charging current has reached a predetermined current value with the continuous increase in charging current, the charging device stops the increase in charging current, and charges the capacitor unit with the constant charging current. Consequently, it is possible to prevent a current value to which the charging current is increased from becoming a very large value when the voltage balance among the capacitors at the start of charging is disrupted.

Third Variation:

In the above first variation, if a charging voltage of any one or more of the capacitors has not reached the set voltage even after a predetermined period of time has elapsed since the capacitor unit has been charged with the reduced charging current, the capacitor unit is charged with the charging current while increasing the charging current on a step-by-step basis. As a third variation of the first embodiment, in the same manner as in the above second variation, the capacitor unit can be charged in such a manner that when the charging current has been increased and reached a predetermined current value, the increase in charging current is stopped.

In FIG. 2 for the above embodiment, when the charging voltages of all the capacitors have reached the set voltage, the application of the charging current is stopped; however, if the voltage balance among the capacitors at the start of charging is disrupted, a current value to which the charging current is increased may become a very large value, and therefore, bypass devices of the parallel monitors need to have a high rated capacity of a current to flow therethrough. To cope with this, when the charging current has reached a predetermined current value with the step-by-step increase in charging current being applied to the capacitor unit, the control circuit 10 stops the increase in charging current being applied to the capacitor unit, and causes the capacitor unit to be charged with the constant charging current.

Figure 9:
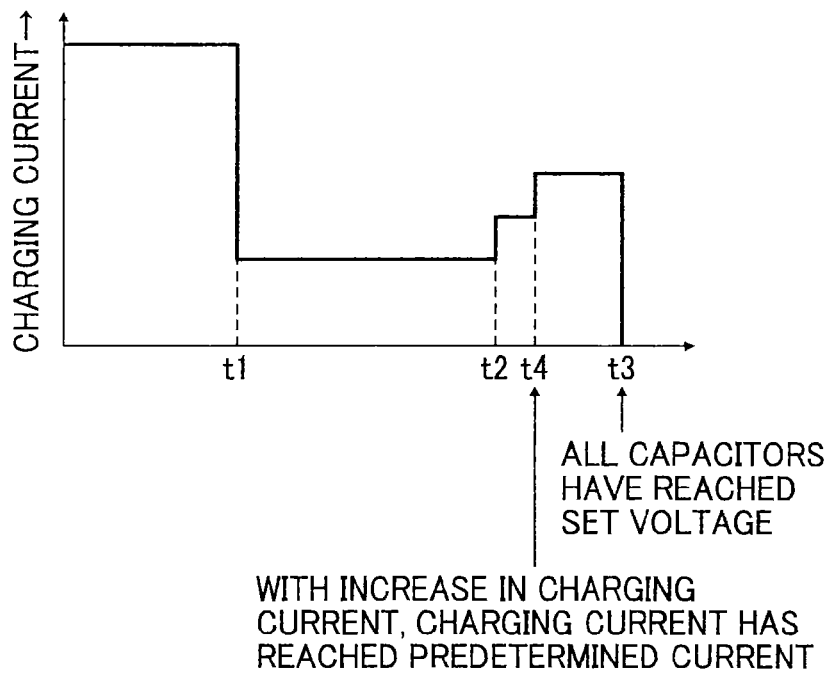
FIG. 9 is an explanatory diagram illustrating changes in charging current being applied to the capacitor unit in the charging device according to a third variation of the first embodiment.

FIG. 9 is an explanatory diagram illustrating changes in charging current being applied to the capacitor unit in a charging device according to the third variation. As shown in FIG. 9, the charging device according to the third variation starts charging the capacitor unit with a constant charging current, and when a charging voltage of any one of the capacitors has reached the set voltage (a time t1), charges the capacitor unit with a reduced charging current and starts the time measurement. Then, when a predetermined period of time has elapsed (a time t2), and if a charging voltage of any one or more of the capacitors has not reached the set voltage, the charging device charges the capacitor unit with the charging current while increasing the charging current on a step-by-step basis. Then, when the charging current has reached a predetermined current value (a time t4), the charging device stops the increase in charging current, and charges the capacitor unit with the constant charging current. Then, when the charging voltages of all the capacitors have reached the set voltage (a time t3), the charging device stops the application of the charging current.

In this manner, when the charging device according to the third variation charges the capacitor unit, in the same manner as in the above embodiment, if a charging voltage of any of the capacitors has reached the set voltage, the charging device reduces the charging current and charges the capacitor unit with the reduced charging current, and performs the time measurement. Consequently, it is possible to suppress the power losses in the parallel monitors.

Then, if a charging voltage of any one or more of the capacitors has not reached the set voltage even after the predetermined period of time has elapsed since the charging current has been reduced, the charging device determines that the voltage balance among the capacitors is disrupted, and charges the capacitor unit with the charging current while increasing the charging current on a step-by-step basis. Consequently, even in the case where the voltage balance among the capacitors is disrupted, it is possible to suppress the power losses that are lost in the parallel monitors, and also possible to reduce the charging time of the capacitor unit.

Furthermore, when the charging current has reached a predetermined current value with the step-by-step increase in charging current, the charging device stops the increase in charging current, and charges the capacitor unit with the constant charging current. Consequently, it is possible to prevent a current value, to which the charging current is increased from, becoming a very large value when the voltage balance among the capacitors at the start of charging is disrupted.

Figure 10:
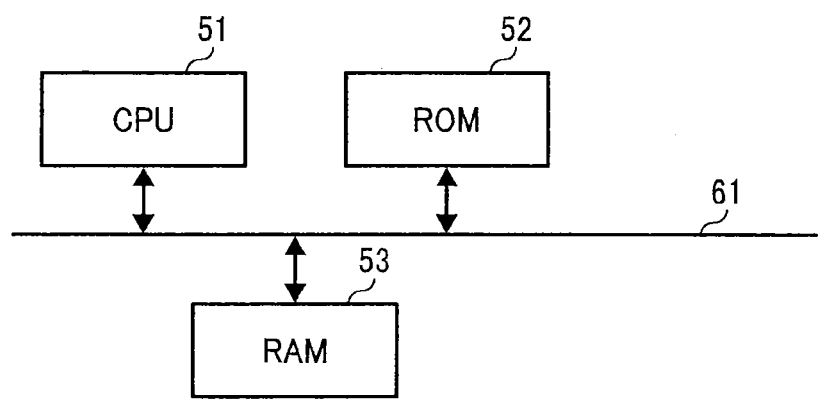
FIG. 10 is a hardware configuration diagram of a control circuit.

Subsequently, an example of a hardware configuration of the control circuit 10 is explained with reference to FIG. 10. FIG. 10 is a hardware configuration diagram of the control circuit 10.

The control circuit 10 includes a control unit such as a central processing unit (CPU) 51, storage units such as a read-only memory (ROM) 52 and a random access memory (RAM) 53, and a bus 61 for connecting the above units to one another.

Incidentally, a program executed by the charging device 100 according to the present embodiment is incorporated in the ROM or the like in advance.

The program executed by the charging device 100 according to the present embodiment can be recorded on a computer-readable recording medium, such as a CD-ROM, a flexible disk (FD), a CD-R, or a digital versatile disk (DVD), in an installable or executable file format so that the program can be provided as a computer program produce.

Furthermore, the program executed by the charging device 100 according to the present embodiment can be stored on a computer connected to a network, such as the Internet, so that the program can be provided by causing a user to download the program over the network. Moreover, the program executed by the charging device 100 according to the present embodiment can be provided or distributed via a network, such as the Internet.

The program executed by the charging device 100 according to the present embodiment is composed of modules including the above-described functions of the control circuit 10. The CPU (a processor), actual hardware, reads out the program from the ROM and executes the program, whereby the functions are loaded on a main memory unit, and the functions are generated on the main memory unit.

Second Embodiment

In a second embodiment, an image forming apparatus including the charging device 100 according to the first embodiment is described. In what follows, there is described a case where the image forming apparatus according to the present embodiment is applied to a multifunction peripheral (MFP). The applicable image forming apparatus is not limited to the MFP, and it can be applied to any image forming apparatuses, such as a copier, a printer, a scanner device, and a facsimile machine.

Figure 11:
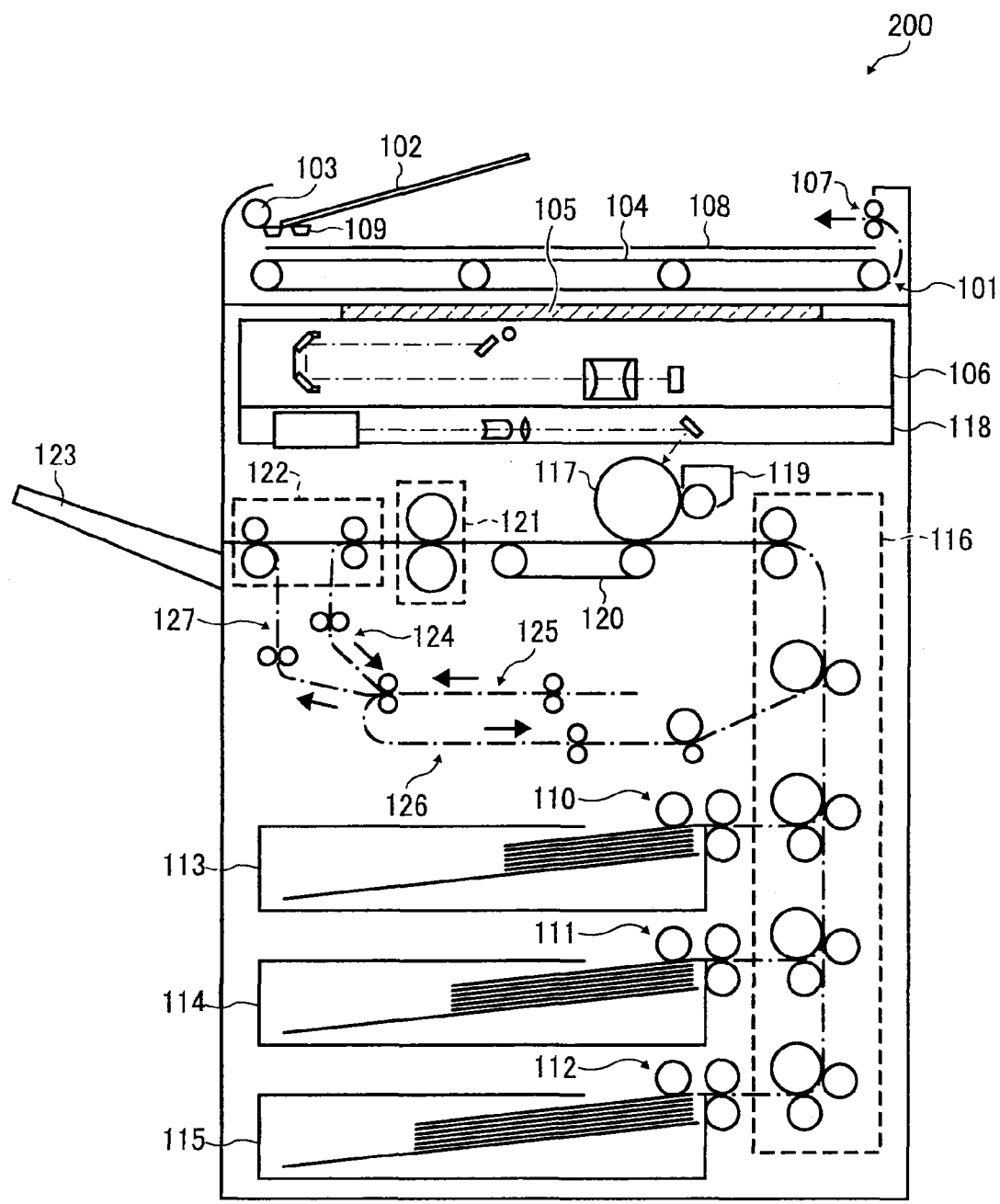
FIG. 11 is a longitudinal cross-sectional view of an MFP according to a second embodiment.

FIG. 11 is a longitudinal cross-sectional view of an MFP 200 according to the second embodiment. The MFP 200 has a copy function and other functions, for example, a print function and a fax function. By the key operation for switching the applications through an operation unit (not shown), the copy, print, and fax functions can be sequentially switched and selected. Consequently, when the copy function is selected, the MFP 200 goes into a copy mode; when the print function is selected, the MFP 200 goes into a print mode; when the fax function is selected, the MFP 200 goes into a fax mode.

Subsequently, a schematic configuration of the MFP 200 and the operation in the copy mode are explained. In FIG. 11, an original is put on an original plate 102 in an automatic document feeder (ADF) 101 with the printed side up; when a start key on the operation unit (not shown) is pressed, the original is fed to a predetermined position on an exposure glass 105 by a sheet feed roller 103 and a feed belt 104. The ADF 101 has the count function for counting up the number of originals each time the feeding of a sheet of original is completed. After image information of the original on the exposure glass 105 is read by an image reading unit 106, the original is discharged onto a sheet discharge plate 108 by the feed belt 104 and a discharge roller 107.

If an original-set detector 109 detects that a next set of originals is present on the original plate 102, a bottommost original of the originals on the original plate 102 is fed to the predetermined position on the exposure glass 105 by the sheet feed roller 103 and the feed belt 104 in the same manner as above. After image information of the original on the exposure glass 105 is read by the image reading unit 106, the original is discharged onto the sheet discharge plate 108 by the feed belt 104 and the discharge roller 107. The sheet feed roller 103, the feed belt 104, and the discharge roller 107 are driven by a conveyance motor.

A first sheet feeder 110, a second sheet feeder 111, and a third sheet feeder 112 feed a transfer sheet contained therein, if selected. The transfer sheet is conveyed to a position where the transfer sheet comes in contact with a photoconductor 117 by a vertical conveyance unit 116. The photoconductor 117 is, for example, a photoconductive drum, and is driven to rotate by a main motor (not shown).

Image data obtained by reading the original by the image reading unit 106 is subjected to predetermined image processing by an image processing apparatus (not shown), and after that, the image data is converted into optical information by a writing unit 118. After the photoconductive drum 117 is uniformly charged by a charger (not shown), the photoconductive drum 117 is exposed to an optical beam corresponding to the optical information by the writing unit 118, and an electrostatic latent image is formed on the photoconductive drum 117. The electrostatic latent image formed on the photoconductive drum 117 is developed into a toner image by a developing device 119. A printer engine is composed of the writing unit 118, the photoconductive drum 117, the developing device 119, other commonly-known devices (not shown) around the photoconductive drum 117, and the like.

A conveyance belt 120 serves as both a sheet conveying means and a transfer means; the conveyance belt 120 is applied with a transfer bias by a power supply, and transfers the toner image on the photoconductive drum 117 onto the transfer sheet conveyed from the vertical conveyance unit 116 while conveying the transfer sheet at a speed equal to the rotating speed of the photoconductive drum 117. After the toner image is fixed on the transfer sheet by a fixing device 121, the transfer sheet is discharged onto a copy receiving tray 123 by a sheet discharge unit 122. After the toner image is transferred onto the transfer sheet, residual toner remaining on the photoconductive drum 117 is cleaned up by a cleaning device (not shown).

The operation described above is made when the MFP 200 forms an image of an original onto one side of a sheet in a normal mode. In a case of forming an image of an original onto both sides of a transfer sheet in a duplex mode, a transfer sheet is fed from any of sheet trays 113 to 115, and an image is formed on the obverse side of the transfer sheet as described above, and after that, the transfer sheet is switched to not the side of the copy receiving tray 123 but the side of a duplex sheet path 124 by the sheet discharge unit 122, reversed by the switchback by a reverse unit 125, and conveyed to a duplex conveyance unit 126.

The transfer sheet conveyed to the duplex conveyance unit 126 is conveyed to the vertical conveyance unit 116 by the duplex conveyance unit 126, and further conveyed to the position where the transfer sheet comes in contact with the photoconductor 117 by the vertical conveyance unit 116; then, a toner image formed on the photoconductive drum 117 in the same manner as described above is transferred onto the reverse side of the transfer sheet, and fixed by the fixing device 121; in this manner, a copy of the original is made on the both sides of the transfer sheet. The transfer sheet on which the images are formed on the both sides thereof is discharged onto the copy receiving tray 123 by the sheet discharge unit 122.

Furthermore, in a case of discharging the transfer sheet with the transfer sheet reversed, the transfer sheet reversed by the switchback by the reverse unit 125 is not conveyed to the duplex conveyance unit 126 but discharged onto the copy receiving tray 123 through a reverse discharge sheet path 127 by the sheet discharge unit 122.

In the print mode, instead of image data from the image processing apparatus described above, image data from the outside is input to the writing unit 118, and an image is formed on a transfer sheet in the same manner as described above.

In the fax mode, image data from the image reading unit 106 is sent to the other device by a fax sending/receiving unit (not shown); furthermore, image data from the other device is received by the fax sending/receiving unit and input to the writing unit 118 instead of image data from the image processing apparatus described above, whereby an image is formed on a transfer sheet in the same manner as described above.

The MFP 200 further includes, although not shown in the diagram, a large-capacity sheet supplying device (hereinafter, referred to as an "LCT"), a finisher for sorting, punching, stapling, etc. the copies, and the operation unit for setting the mode for reading an original, the copy magnification, the sheet drawer, and a type of post-processing performed by the finisher and displaying thereon information with respect to an operator.

Figure 12:
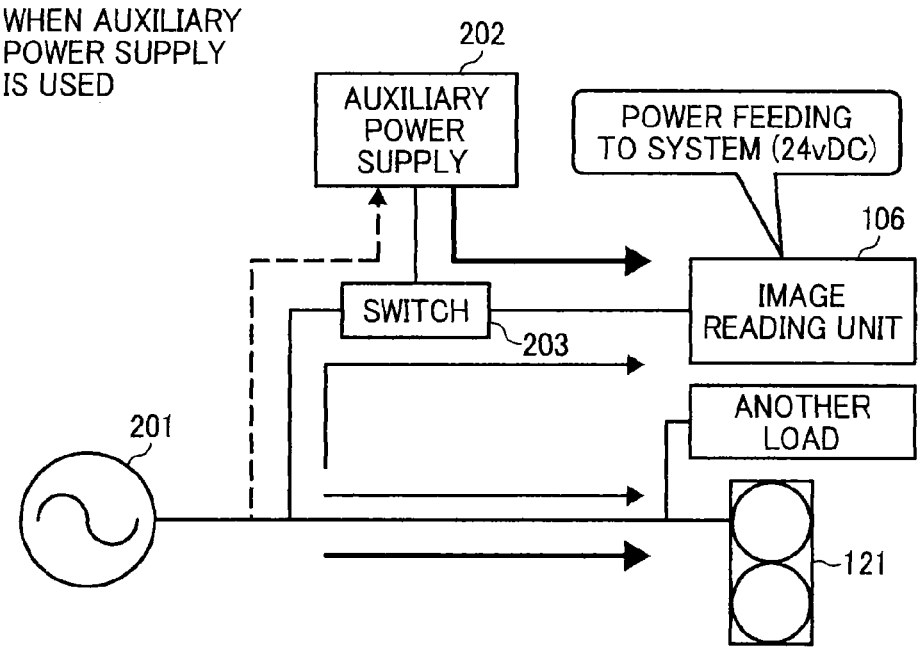
FIG. 12 is an explanatory diagram illustrating an example of a power-supply control process performed by a power-supply unit.

An outline of a power-supply control process performed by a power-supply unit included in the MFP 200 according to the present embodiment is explained with reference to FIG. 12. FIG. 12 is an explanatory diagram illustrating an example of the power-supply control process performed by the power-supply unit.

A commercial power supply 201 is a main power supply for driving the image reading unit 106, the fixing device 121, and other loads such as the printer engine and the motors. An auxiliary power supply 202 is a chargeable and dischargeable electric storage unit that is charged by being supplied with power from the commercial power supply 201, and that drives a load with the charged power.

In the present embodiment, as the auxiliary power supply 202, the capacitors C1 to Cn, which are connected in series and compose the capacitor unit as described in the first embodiment, are used. Furthermore, in the present embodiment, as a device that charges the auxiliary power supply 202 (the capacitors C1 to Cn), the charging device 100 according to the first embodiment is used (not shown in FIG. 12).

A switch 203 is used to turn on and off the electric charge from the commercial power supply 201 to the auxiliary power supply 202 and turn on and off the power feeding from the auxiliary power supply 202. The switch 203 is, for example, a switch connecting a common contact on the side of the auxiliary power supply 202 to any of a contact on the side of the commercial power supply 201, a contact on the side of the image reading unit 106, and a contact that is not connected to either of the two. Alternatively, the functions of the switch 203 can be achieved by a combination with two or more relays or a FET. In the present embodiment, in a normal state such as at the start-up, the switch 203 is turned off, and the power-supply unit feeds power from the commercial power supply 201 to the system including the image reading unit 106, another load, and the fixing device 121. Furthermore, when extra power is supplied from the commercial power supply 201, the switch 203 is connected to the contact on the side of the commercial power supply 201, and the auxiliary power supply 202 is charged with the power. On the other hand, in a case of using the auxiliary power supply, for example, when operating the image reading unit 106 and the fixing device 121 at the same time, the power-supply unit connects the switch 203 to the contact on the side of the image reading unit 106 to drive the image reading unit 106 by power from the auxiliary power supply 202, thereby increasing an amount of power to be fed from the commercial power supply 201 to the fixing device 121. Incidentally, in the example shown in FIG. 12, power from the auxiliary power supply 202 is fed only to the image reading unit 106; however, it is not limited to this. For example, power from the auxiliary power supply 202 can be fed to the fixing device 121 or another load.

Figure 13:
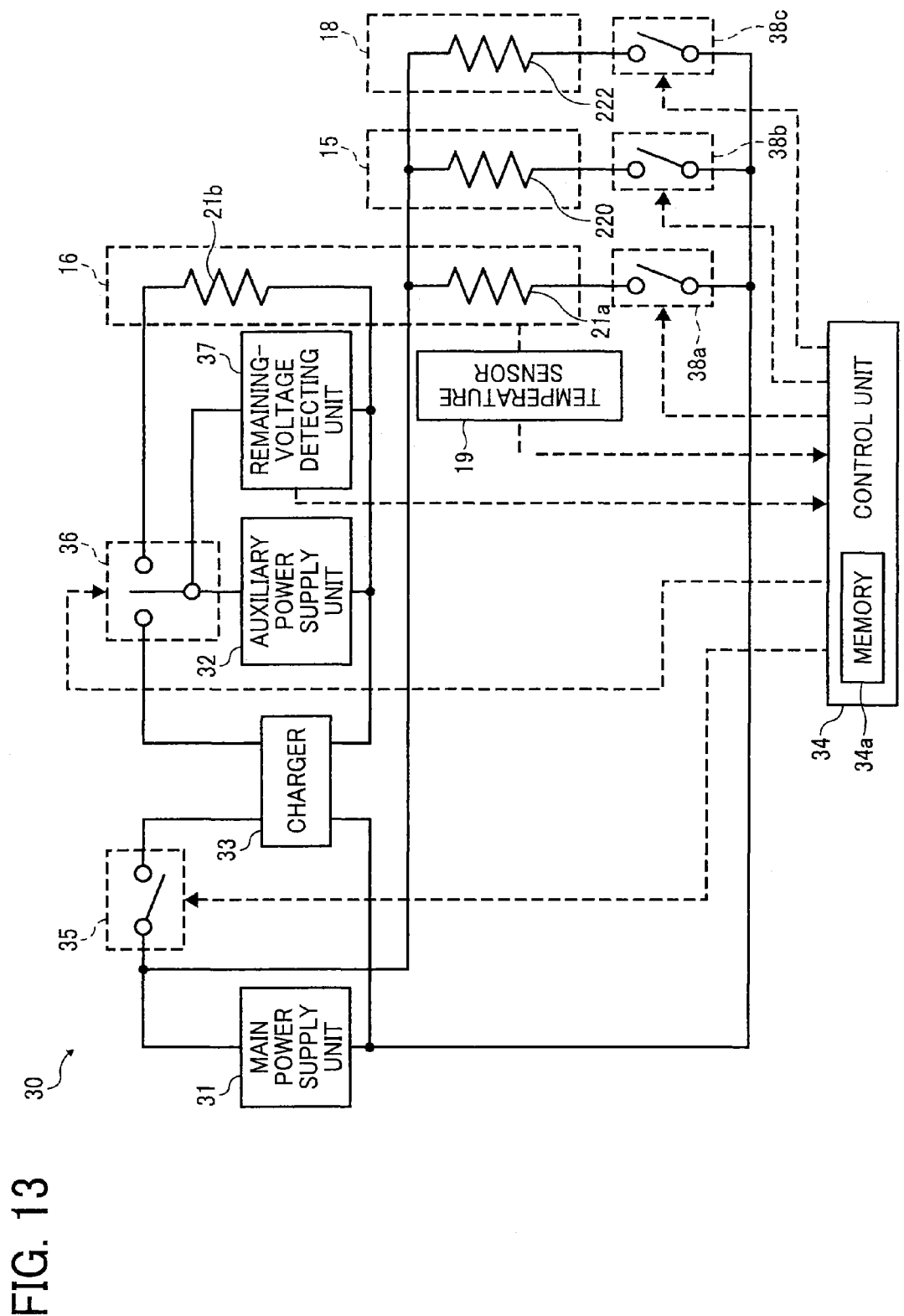
FIG. 13 is a circuit diagram illustrating an example of a heating device for heating a fixing device.

An example of a configuration for feeding power from the auxiliary power supply to the fixing device 121 is explained with reference to FIG. 13. FIG. 13 is a circuit diagram illustrating an example of a heating device 30 for heating the fixing device 121.

The heating device 30 includes, as shown in the circuit diagram of FIG. 13, a main power supply unit 31, an auxiliary power supply unit 32, a charger 33, a control unit 34, a charging switch 35, a switch 36, a remaining-voltage detecting unit 37, and switches 38a, 38b, and 38c. The switches 38a, 38b, and 38c turn on and off the application of current to a main heating element 21a of a fixing roller 16, a heating element 220 of a heat roller 15, and a heating element 222 of a pressure roller 18, respectively.

The main power supply unit 31 is connected to an AC 100V, a commercial power supply, and has the function of adjusting the voltage depending on the fixing device 121, the function of rectifying from alternate current to direct current, and the like. The auxiliary power supply unit 32 supplies power to an auxiliary heating element 21b of the fixing roller 16, and includes a chargeable and dischargeable high-capacity capacitor.

The control unit 34 includes a CPU and a memory 34a (the memory 34a can be built into the CPU), and manages the operation of the entire MFP 200. Specifically, when receiving a signal from any of the remaining-voltage detecting unit 37 and a temperature sensor 19, the control unit 34 controls the operations of the charging switch 35, the switch 36, and the switches 38a, 38b, and 38c. The charging switch 35 is used to turn on and off the power supply from the main power supply unit 31 to the charger 33. The switch 36 is used to switch between the charging of the auxiliary power supply unit 32 and the power supply from the auxiliary power supply unit 32 to the auxiliary heating element 21b. The remaining-voltage detecting unit 37 detects a remaining capacity of the capacitor of the auxiliary power supply unit 32.

Incidentally, in the present embodiment, the main power supply unit 31 is connected the main heating element 21a, the heating element 220, and the heating element 222 as well as the auxiliary power supply unit 32 via the charger 33. Since the maximum capacity of the auxiliary power supply unit 32, which is a commercial power supply or the like, is predetermined (for example, 100V/15 A), when the charging of the auxiliary power supply unit 32 via the charger 33 is made simultaneously with the power supply to the main heating element 21a, the heating element 220, and the heating element 222, it is necessary to set the heating elements used and the like so that a total value of respective maximum values does not exceed the capacity of the power supply. Incidentally, when such simultaneous supply is not performed, the settings which may lead the total value to exceed the capacity of the power supply can be made; however, in such a case, it is necessary to control a total value of the capacities of the elements to which power is supplied simultaneously not to exceed the capacity of the power supply.

In the example shown in FIG. 13, as the auxiliary power supply unit 32, the capacitors C1 to Cn, which are connected in series and compose the capacitor unit as described in the first embodiment, are used. Furthermore, as a device that charges the auxiliary power supply unit 32 (the capacitors C1 to Cn), the charging device 100 according to the first embodiment is used. For example, the charger 33, the control unit 34, and the remaining-voltage detecting unit 37 shown in FIG. 13 are configured to have the functions of the charging circuit 20, the control circuit 10, and the parallel monitors M1 to Mn of the charging device 100, respectively.

According to the present invention, if the capacitor unit has not reached the set voltage even after the predetermined period of time has elapsed since the charging current being applied to the capacitor unit has been reduced, the charging current being applied to the capacitor unit is increased, whereby even if the voltage balance among the capacitors is disrupted, it is possible to suppress the power losses in the bypass circuit, and also possible to reduce the charging time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charging device comprising:
   a plurality of capacitors that are connected in series;
   a charging unit that charges the capacitors;
   a plurality of bypass units, each of which respectively connects in parallel to each of the capacitors, wherein each bypass unit causes, when a charged voltage of any of the capacitors has reached a set voltage, a charging current to bypass the charged capacitor whose charged voltage has reached the set voltage; and
   a control unit that controls the charging unit to charge the capacitors in such a manner that,
      when a charging voltage of the charged capacitor has reached the set voltage, the control unit causes the charging unit to reduce the charging current that is to be applied to the remaining capacitors, and
      if, after a predetermined period of time has elapsed since the charging voltage of the charged capacitor has reached the set voltage, and if a charging voltage of the remaining capacitors has not reached the set voltage, the control unit causes the charging unit to increase the charging current that is to be applied to the remaining capacitors, and if the charging current has reached a predetermined current value after having increased the charging current applied to the remaining capacitors, the control unit causes the charging unit to stop increasing the charging current to the remaining capacitors and to charge the remaining capacitors with a constant current, wherein, when the charging voltage of the charged capacitor has reached the set voltage, one or more signals are transmitted to the control unit.

2. The charging device according to claim 1, wherein if the predetermined period of time has elapsed since the charging voltage of the any capacitor has reached the set voltage, and if the charging voltage of any of the other capacitors has not reached the set voltage after the predetermined period of time has elapsed, the control unit causes the charging unit to continuously increase the charging current that is to be applied to the capacitors.

3. The charging device according to claim 1, wherein if the predetermined period of time has elapsed since the charging voltage of the any capacitor has reached the set voltage, and if the charging voltage of the any of the other capacitors has not reached the set voltage after the predetermined period of time has elapsed, the control unit causes the charging unit to increase the charging current that is to be applied to the capacitors on a step-by-step basis.

4. An image forming apparatus comprising:
an image forming unit; and
a charging device, wherein
the charging device includes
a plurality of capacitors that are connected in series;
a charging unit that charges the capacitors;
a plurality of bypass units, each of which respectively connects in parallel to each of the capacitors, wherein
each bypass unit causes, when a charged voltage of any of the capacitors has reached a set voltage, a charging current to bypass the charged capacitor whose charged voltage has reached the set voltage; and
a control unit that controls the charging unit to charge the capacitors in such a manner that,
when a charging voltage of the charged capacitor has reached the set voltage, the control unit causes the charging unit to reduce the charging current that is to be applied to the remaining capacitors, and
if, after a predetermined period of time has elapsed since the charging voltage of the charged capacitor has reached the set voltage, and if a charging voltage of the remaining capacitors has not reached the set voltage, the control unit causes the charging unit to increase the charging current that is to be applied to the remaining capacitors, and
if the charging current has reached a predetermined current value after having increased the charging current applied to the remaining capacitors, the control unit causes the charging unit to stop increasing the charging current to the remaining capacitors and to charge the remaining capacitors with a constant current, wherein, when the charging voltage of the charged capacitor has reached the set voltage, one or more signals are transmitted to the control unit.

5. A non-transitory computer readable medium having computer-readable program codes embodied in the medium for processing a charging device that includes: a plurality of capacitors that are connected in series; a charging unit that charges the capacitors; a plurality of bypass units, each of which respectively connects in parallel to each of the capacitors, wherein each bypass unit causes, when a charged voltage of any of the capacitors has reached a set voltage, a charging current to bypass the charged capacitor whose charged voltage has reached the set voltage; and a control unit that controls the charging unit to charge the capacitors, the program codes when executed causing a computer to execute:
controlling the charging unit to reduce the charging current that is to be applied to the remaining capacitors, when a charging voltage of the charged capacitor has reached the set voltage;
controlling the charging unit to increase the charging current that is to be applied to the remaining capacitors if, after a predetermined period of time has elapsed since the charging voltage of the charged capacitor has reached the set voltage, and if a charging voltage of any of the remaining capacitors has not reached the set voltage; and
controlling the charging unit to stop increasing the charging current to the remaining capacitors and to charge the remaining capacitors with a constant current if the charging current has reached a predetermined current value after having increased the charging current applied to the remaining capacitors, wherein, when the charging voltage of the charged capacitor has reached the set voltage, one or more signals are transmitted to the control unit.

* * * * *